(12) United States Patent
Kosov et al.

(10) Patent No.: US 7,975,255 B2
(45) Date of Patent: Jul. 5, 2011

(54) METHOD, APPARATUS, AND PROGRAM PRODUCT FOR BUILDING INTEGRATION WORKFLOW ENDPOINTS INTO WEB COMPONENTS

(75) Inventors: Yury Kosov, San Francisco, CA (US); Oleg Musteata, Hayward, CA (US); Saravanakumar Anthivur Srinivasan, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 11/291,716

(22) Filed: Dec. 1, 2005

(65) Prior Publication Data

US 2007/0130152 A1 Jun. 7, 2007

(51) Int. Cl.
*G06F 9/44* (2006.01)
*G06Q 10/00* (2006.01)
(52) U.S. Cl. ......... 717/120; 717/104; 717/108; 705/301
(58) Field of Classification Search .................. None
See application file for complete search history.

(56) References Cited

U.S. PATENT DOCUMENTS

| | | | |
|---|---|---|---|
| 7,281,235 B2 * | 10/2007 | Datta et al. ..................... | 717/104 |
| 7,818,714 B2 * | 10/2010 | Ryan et al. ..................... | 717/104 |
| 2003/0187743 A1 * | 10/2003 | Kumaran et al. ............... | 705/26 |
| 2003/0204645 A1 * | 10/2003 | Sharma et al. ................. | 709/328 |
| 2004/0044985 A1 * | 3/2004 | Kompalli et al. .............. | 717/100 |
| 2004/0064805 A1 * | 4/2004 | Sparago et al. ................ | 717/120 |
| 2005/0044197 A1 * | 2/2005 | Lai ................................. | 709/223 |
| 2006/0095274 A1 * | 5/2006 | Phillips et al. .................... | 705/1 |
| 2008/0250393 A1 * | 10/2008 | Bolene et al. .................. | 717/120 |
| 2009/0006114 A1 * | 1/2009 | Donovan et al. .................. | 705/1 |

OTHER PUBLICATIONS

Cutlip, Rob. Business process integration with IBM CrossWorlds, Part 1: Introduction to collaboration development, IBM developerWorks [online], May 1, 2002 [retrieved on May 20, 2010], pp. 1-10. Retrieved from the Internet: <URL: http://www.ibm.com/developworks/ibm/library/i-cross/>.*

"A Java web application for allowing multiuser collaboration and exploration of existing VRML worlds", C. Presser, Mar. 2005, pp. 85-92, <http://delivery.acm.org/10.1145/1060000/1050503/p85-presser.pdf>.*

"Agent-based integration of Web Services with Workflow Management Systems", Savarimuthu et al., Jul. 2005, pp. 1345-1346, <http://delivery.acm.org/10.1145/1090000/1082765/p1345-savarimuthu.pdf>.*

"Supporting interactive workflow systems through graphical web interfaces and interactive simulators", Bruno et al., Sep. 2005, pp. 63-70, <http://delivery.acm.org/10.1145/1130000/1122948/p63-bruno.pdf>.*

"web services concepts—a technical overview", http://www.hpmiddleware.com/downloads/pdf/web_services_tech_overview.pdf , pp. 1-13.

* cited by examiner

*Primary Examiner* — Thuy Dao
(74) *Attorney, Agent, or Firm* — Yee & Associates, P.C.; Prentiss W. Johnson

(57) ABSTRACT

A relay component is deployed to a Web application. The relay component converts Web software components to a format expected by an integration broker. Developers may then implement an integration strategy entirely in the integration broker and then connect the presentation layer of the Web pages to the integration broker logic via the Web software components. When the data format of the disparate applications changes or is otherwise updated, developers may simply rebind the business object definitions from the integration brokers to Web software components, rather than recoding the entire Web application.

24 Claims, 4 Drawing Sheets

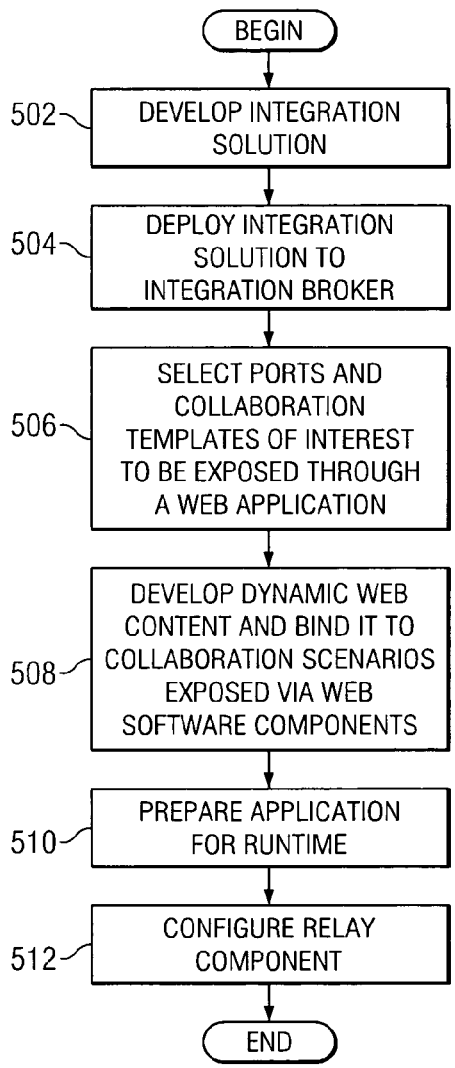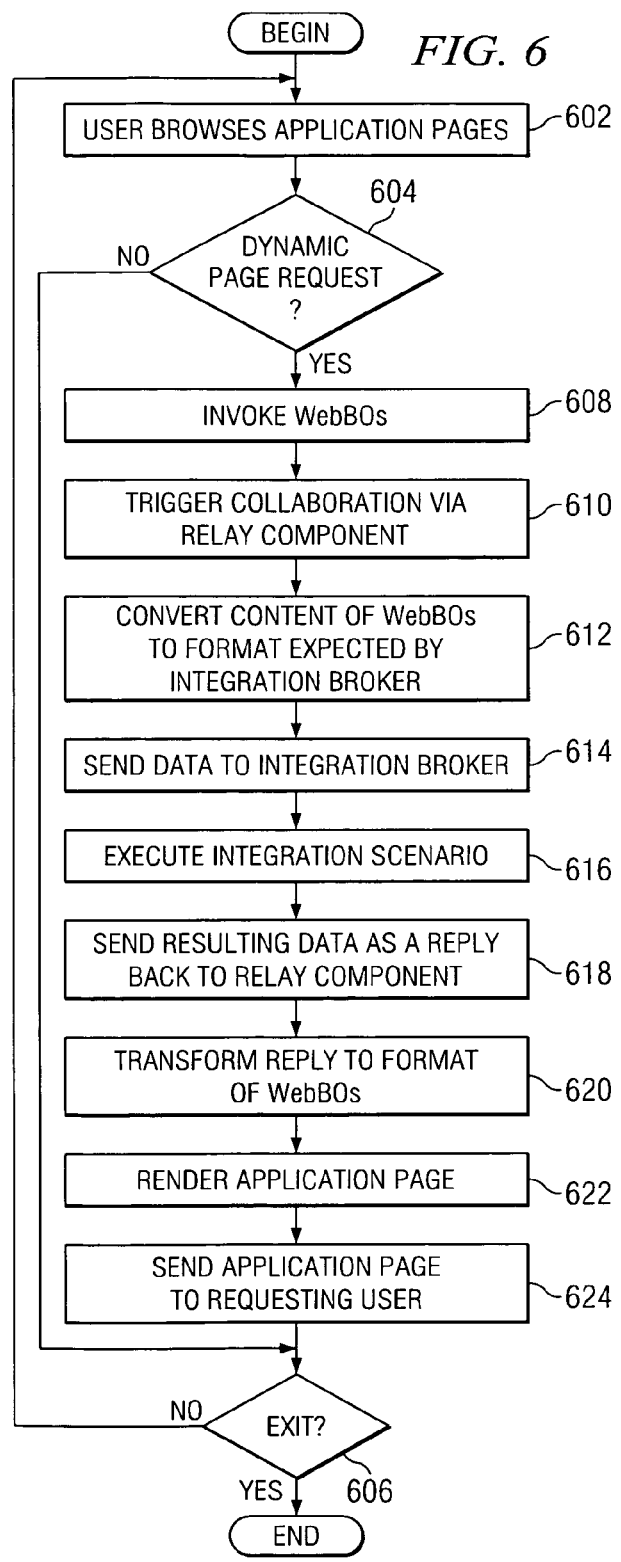

METHOD, APPARATUS, AND PROGRAM PRODUCT FOR BUILDING INTEGRATION WORKFLOW ENDPOINTS INTO WEB COMPONENTS

BACKGROUND OF THE INVENTION

1. Field of the Invention

The present invention relates generally to data processing and, more particularly, to application integration in a network data processing system. Still more particularly, the present invention relates to building integration workflow endpoints into Web components for a Web application.

2. Description of the Related Art

Heterogeneous computing environments use hardware and system software from different vendors. Organizations often use computers, operating systems, and databases from a variety of vendors. Application integration involves translating data and commands from the format of one application into the format of another. Application integration is essentially data and command conversion on an ongoing basis between two or more heterogeneous systems. Implementing application integration has traditionally been done by tedious programming, or occasionally one package might support the interfaces of one or two other packages. However, the trend today is to use message brokers, application servers, and other specialized integration products that provide a common connecting point.

Many companies also provide a Web presence to their backend systems. For example, a Web application may allow a customer to order a product. Prepackaged "middleware" solutions have become available to Web enable the enterprise. However, interfacing multiple heterogeneous systems with a Web application presents many problems to developers and administrators. Interface solutions are typically specific for a particular back-end application.

SUMMARY OF THE INVENTION

The present invention recognizes the disadvantages of the prior art and provides a mechanism for binding integration workflow endpoints to a Web application. A Web application server runs a Web application. An integration broker defines one or more application software components and one or more collaboration templates. One or more Web software components at the Web application server interface with the Web application and correspond to the one or more application software components defined in the integration broker. A relay component at the Web application server is configured to convert between application software components and Web software components. Responsive to a request for dynamic Web page, the integration broker executes an integration solution. The relay component interfaces between the one or more Web application software components and the one or more application software components.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart illustrating the operation of integration solution development and Web application development in accordance with exemplary aspects of the present invention; and FIG. 6 is a flowchart illustrating the operation of a Web application and integration components at runtime in accordance with exemplary aspects of the present invention.

DETAILED DESCRIPTION OF THE PREFERRED EMBODIMENT

Figure 1:
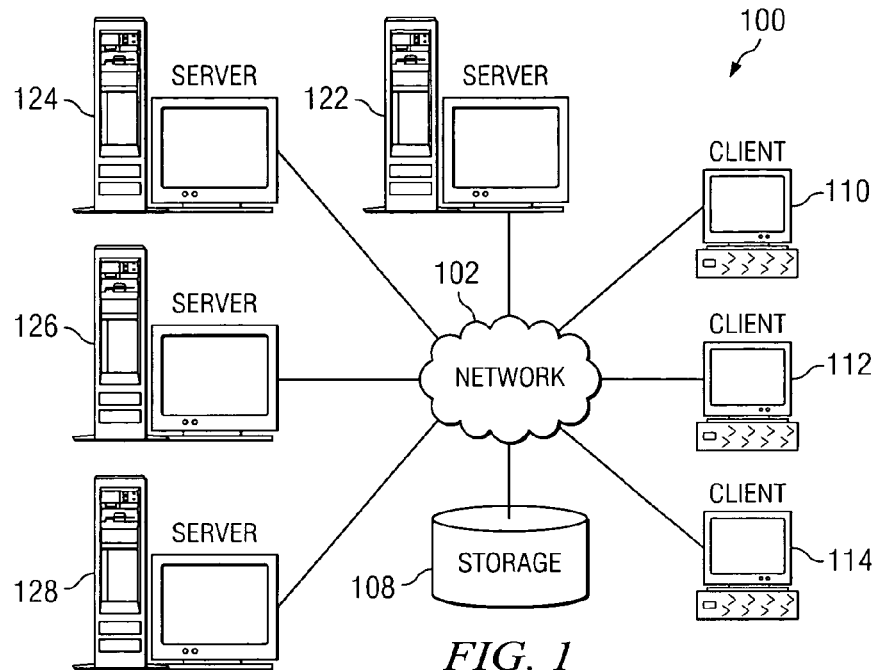
FIG. 1 depicts a pictorial representation of a network of data processing systems in which exemplary aspects of the present invention may be implemented.
Figure 2:
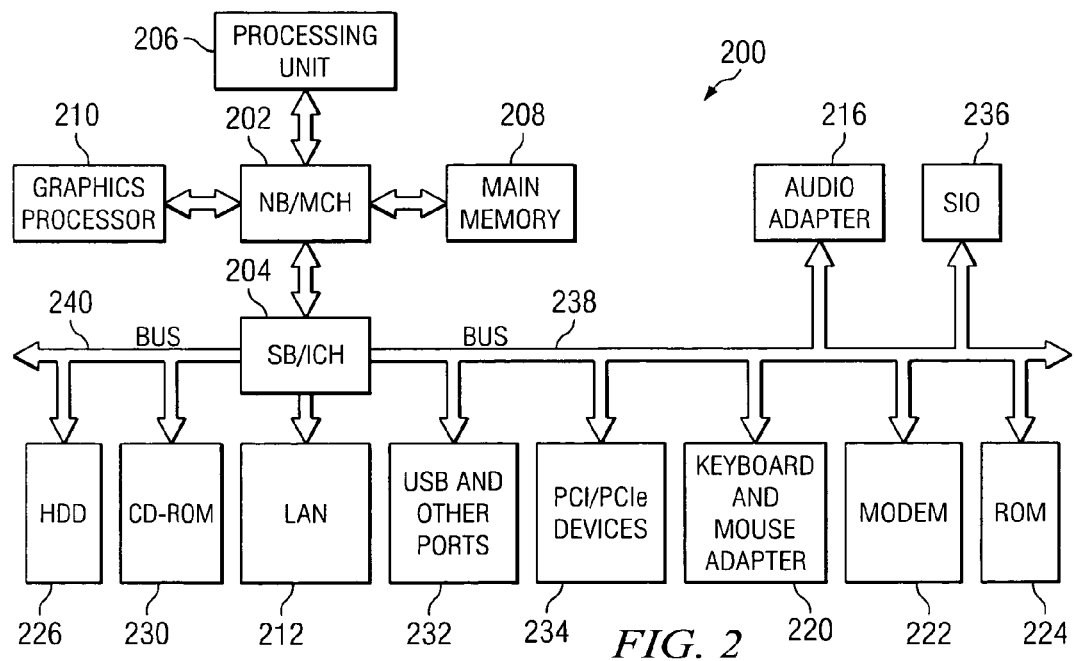
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which exemplary aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, servers 122, 124, 126, and 128 connect to network 102 along with storage unit 108. In addition, clients 110, 112, and 114 connect to network 102. These clients 110, 112, and 114 may be, for example, personal computers or network computers. In the depicted example, server 122, for instance, may provide data, such as boot files, operating system images, and applications to clients 110, 112, and 114. Clients 110, 112, and 114 are clients to server 122 in this example. Network data processing system 100 may include additional servers, clients, and other devices not shown.

In accordance with exemplary aspects of the present invention, servers 122 and 124, for instance, may provide heterogeneous enterprise applications; server 126 may provide application integration; and, server 128 may provide Web applications for a company. Server 126 may provide an integration broker for application integration. An integration broker includes a repository in which business object definitions are stored that define application-specific and generic business objects that participate in the integration scenarios, a number of collaboration objects, and an application development kit and an access interface, which permit the writing of adapter specific to various applications that can interact with the integration broker in an abstract fashion.

Server 128 may provide a Web application that is developed using a Web application developer (WAD). Developers use a WAD to design, implement, and test their Web applications before deploying them to an application server, such as server 128 in this example, for implementation.

In the domain of enterprise application integration (EAI), a business object definition defines an application specific or generic data structure used in the integration process between heterogeneous systems. The term "business object" does not necessarily imply that a business practice is performed. For example, a business object could define a customer in a financial database or a customer in an inventory database; however, a business object could also define an entity that is not concerned with a business process. A business object definition could also specify what action, event, or processing instruction a business object is carrying out as it moves between heterogeneous systems through an integration broker. A concrete instance of a business object definition is called a business object. Business objects will also be referred to herein as "application software components."

In accordance with exemplary aspects of the present invention, an integration solution is provided that allows a level of compatibility and cohesion that allows developers to bind together the EAI domain and Web application, yet keep EAI development and Web development separate from one another. An intermediary format, referred to herein as a Web business object (WebBO) is provided. A relay component (RC) transforms EAI business objects and Web data to and from WebBOs. WebBOs will also be referred to herein as "Web software components."

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as MICROSOFT® WINDOWS® XP (MICROSOFT and WINDOWS are trademarks of Microsoft Corporation in the United States, other countries, or both). An object-oriented programming system, such as the JAVA™ programming system, may run in conjunction with the operating system and provides calls to the operating system from JAVA™ programs or applications executing on data processing system 200 (JAVA is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
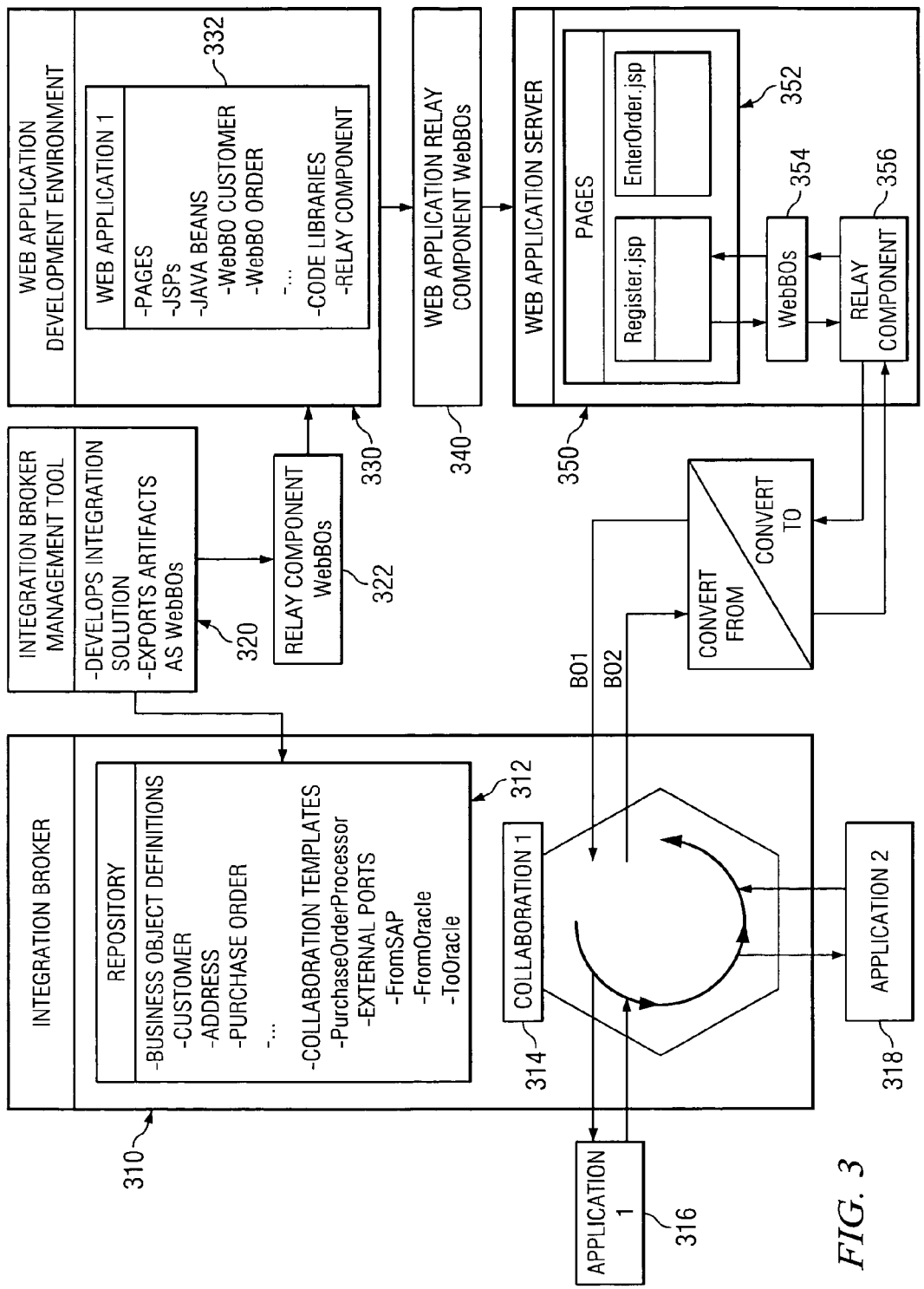
FIG. 3 is a block diagram illustrating application integration development and Web application developing with binding of application integration with a Web application in accordance with exemplary aspects of the present invention.

With reference now to FIG. 3, a block diagram illustrating application integration development and Web application developing with binding of application integration with a Web application is shown in accordance with exemplary aspects of the present invention. Integration broker 310 provides enterprise application integration. Integration broker (IB) 310 includes repository 312 in which business definitions are stored that define application-specific and generic business objects that participate in the integration scenarios.

Repository 312 also contains a number of collaboration templates that define the integration workflow of data between disparate applications using business objects (BOs). Each template can be configured to accept data from disparate applications via various "ports." The term "ports" is used herein to refer to software connections, i.e. inputs and outputs, to and from an integration solution.

Integration broker 310 also includes a number of collaboration objects, such as collaboration 1 314, which are instances of collaboration templates and perform integration work at runtime by accepting BOs from applications at some ports, transforming the data and replying to other applications via other ports. In addition, an application development kit (ADK) (not shown) and an access interface (AI) (not shown) permit the writing of adapters specific to various applications that can interact with the integration broker in an abstract fashion. Application 1 316 and application 2 318 are examples of applications that can interact with collaboration 1 314 in the illustrated example.

Integration broker management tool 320 is used by developers to manage the integration broker artifacts and processes. Among other things, integration broker management tool 320 can start and stop integration broker 310, manipulate repository artifacts in repository 312, and monitor runtime objects, such as collaboration object 314. An integration broker administrator/developer uses integration broker management tool 320 to develop business object definitions and collaboration templates that are deployed to repository 312. Integration broker management tool 320 also exports a relay component and WebBOs to Web application development environment 330. There is only one relay component per type of integration broker.

Web application development environment 330 is used to write and deploy Web applications to an application server, such as Web application server 350 to be described further below. Web application development environment 330 may or may not adhere to any mainstream application development standards, such as the JAVA™ 2 enterprise edition (J2EE™) programming model. An example of a Web application development environment is IBM's Relational Application Developer version 6.0.

Typically, a Web application development environment contains various static hypertext markup language (HTML) pages, media and art, dynamic pages that can be programmed to provide rich functionality (e.g., JAVA™ Server Pages (JSP™) or MICROSOFT® Application Server Pages), code libraries containing stock implementations of typical Web development tasks, and reusable software components that can be manipulated visually using a builder tool.

In the depicted example shown in FIG. 3, a Web developer uses Web application development environment 330 to design, implement, and/or test Web application 1 332 and deploys the Web application 1 332, along with relay component and WebBOs 322, shown together as Web application relay component and WebBOs 340, to Web application server 350.

Web application server 350 may be, for example, an abstract application server, which is a scalable software system that can serve multiple applications to thin clients. Other popular application servers include APACHE TOMCAT and IBM's WEBSPHERE® application server ("APACHE" and "TOMCAT" are trademarks of The Apache Software Foundation in the United States, other countries, or both). Web application server implements Web application 1 332 as pages 352 and integrates Web application 1 332 using Web-BOs 354 and relay component 356.

As stated above, WebBOs are exported to Web application development environment 330 using integration broker management tool 320. In an exemplary embodiment, WebBOs may be an implementation of JAVABEANS™ software components in the sense that they can be manipulated visually in Web application development environment 330 to bind their properties to various Web components, such as text boxes, buttons, item lists, and drop-down lists.

However, a key aspect of their implementation is the fact that internally they correspond to business objects that interface with disparate applications. For example, one WebBO from WebBOs 354 may have a property mapped to a text field to input a customer's name. This WebBO may be correlated by relay component 356 to a database column in a database. Developers can, therefore, keep their Web development and EAI development separate and link them together using Web-BOs 354.

As stated above, relay component 356 is also exported from integration broker management tool 320 to Web application development environment 330. Relay component 356 interfaces on one end with the access interface of integration broker 310 and on the other end with WebBOs 354. In turn, WebBOs 354 interface with pages 352. Relay component 356 converts business objects from collaboration 314 to WebBOs 354 and vice versa.

Figure 4:
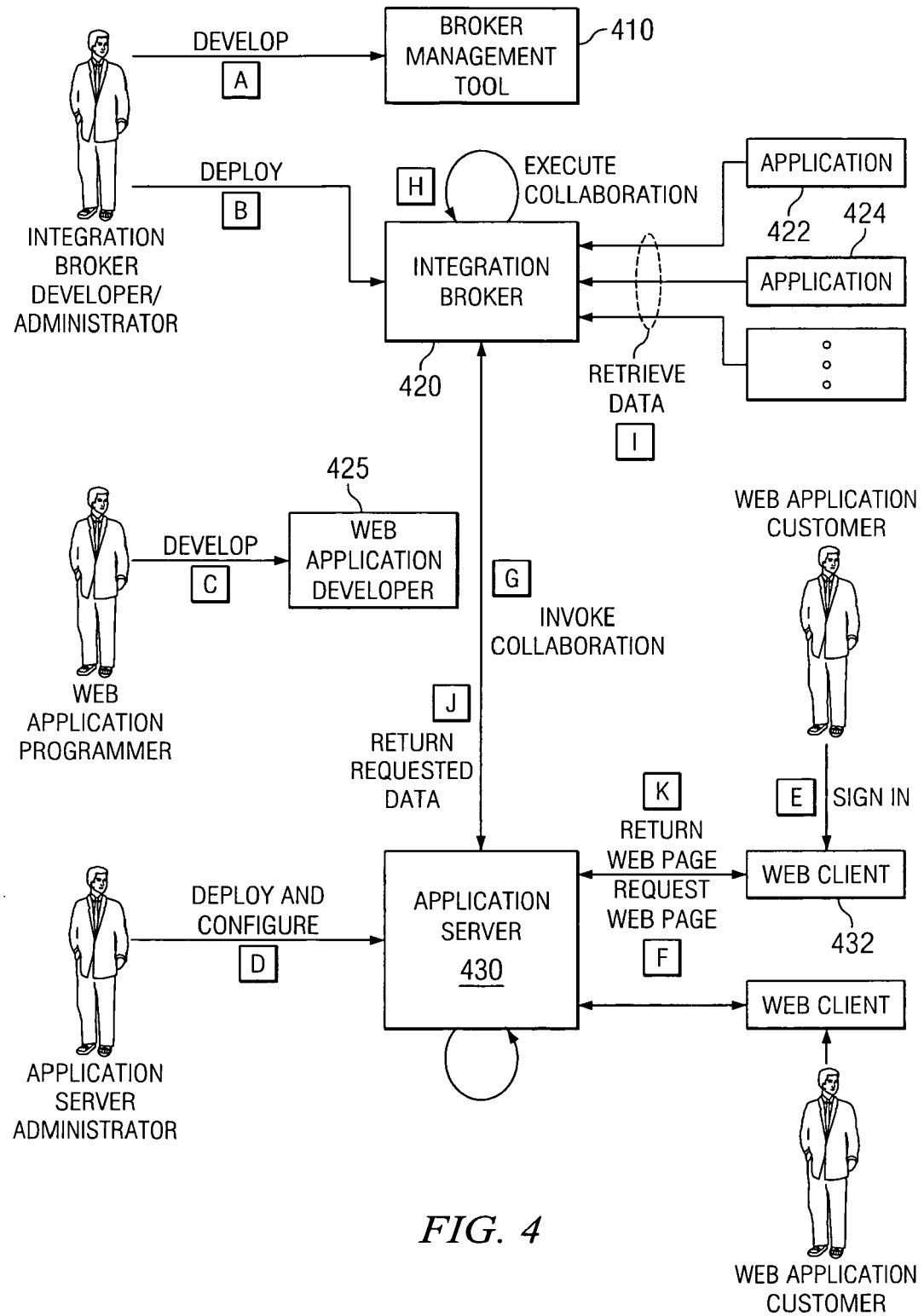
FIG. 4 illustrates a typical usage scenario in accordance with exemplary aspects of the present invention.

FIG. 4 illustrates a typical usage scenario in accordance with exemplary aspects of the present invention. In step A, an integration broker developer/administrator develops an integration solution using broker management tool 410. In step B, the integration broker developer/administrator deploys the integration solution to integration broker 420. Using broker management tool 410, the integration broker developer/administrator can select collaboration templates of interest to expose through a Web application.

Next, in step C, a Web application programmer develops the dynamic Web content using Web application developer 425 and binds it to collaboration scenarios exposed via WebBO software components. The Web application programmer uses Web application developer 425 to bind WebBO fields to Web components on the dynamic pages. WebBOs also allow developers to associate the name of the collaboration object to be invoked and its entry port with HTML form-submission controls, such as buttons.

The application server administrator deploys and configures the Web application, the WebBOs, and the relay component to application server 430 in step D. In an exemplary embodiment, the Web application developer may prepare the application for runtime by exporting it as a standard J2EE™ Web archive (WAR) file. Alternatively, the Web application programmer may deploy the application directly to application server 430. The application server administrator deploys and configures the relay component to application server 430 by specifying which integration broker it should connect to when relaying data from the Web to and from an integration scenario.

At runtime, in step E, a Web application customer signs into Web client 432 and browses the application pages. As an example, the Web application customer may browse a product list at an online retailer. This browsing results in Web client 432 issuing a request to application server 430 in step F. When application server 430 receives a dynamic page request, it begins to prepare content.

When preparing a page, the page controls invoke the WebBO software components, which in turn trigger the collaboration via the relay component in step G. The relay component knows the data format expected by integration broker 420 and converts the content of WebBOs to that format and sends the result to the collaboration object in integration broker 420.

Next, in step H, integration broker 420 executes the integration scenario. Integration broker 420 retrieves and transforming data from disparate applications, such as applications 422, 424, in step I. Thereafter, in step J, integration broker 420 sends the data as a reply back to the relay component in application server 430. In turn, the relay component transforms the data from integration broker 420 to the format of the WebBOs in application server 430. Application server 430 receives the data from the collaboration, renders it in the application page, and returns the page to Web client 432 in step K.

FIG. 5 is a flowchart illustrating the operation of integration solution development and Web application development in accordance with exemplary aspects of the present invention. FIG. 6 is a flowchart illustrating the operation of a Web application and integration components at runtime in accordance with exemplary aspects of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions, which execute on the processor or other programmable data processing apparatus create means for implementing the functions specified in the flowchart block or blocks.

These computer program instructions may also be stored in a computer-readable memory, transmission medium, or storage medium that can direct a processor or other programmable data processing apparatus to function in a particular manner, such that the instructions stored in the computer-readable memory, transmission medium, or storage medium produce an article of manufacture including instruction means which implement the functions specified in the flowchart block or blocks.

Accordingly, blocks of the flowchart illustration support combinations of means for performing the specified functions, combinations of steps for performing the specified functions and computer usable program code for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With particular reference to FIG. 5, operation begins and an integration developer develops an integration solution (block 502) and deploys the integration solution to the integration broker (block 504). Next, the developer selects ports and collaboration templates of interest to be exposed through a Web software components (block 506).

Then, a Web application developer develops dynamic Web content and binds the Web content to collaboration scenarios exposed through the Web software components (block 508). An application server administrator then prepares the application for runtime (block 510) and configures the relay component (block 512). Thereafter, operation ends.

With reference now to FIG. 6, a flowchart illustrating the operation of a Web application and integration components at runtime is shown. Operation begins and a user browses application pages of the Web application (block 602). The Web application determines whether a request for a dynamic page is received (block 604).

If a request for a dynamic page is not received, a determination is made as to whether an exit condition exists (block 606). An exit condition may exist, for example, if the Web application closes or the Web server shuts down. If an exit condition exists, operation ends; otherwise, operation returns to block 602 where the user browses application pages.

If a dynamic page is requested in block 604, the Web application invokes WebBOs (block 608). In turn, the WebBOs trigger collaboration via a relay component (block 610). The relay component converts content of the WebBOs to a format expected by the integration broker (block 612). The relay component sends the data to the integration broker (block 614).

The integration broker executes the integration scenario (block 616) and sends resulting data as a reply back to the relay component (block 618). In turn, the relay component transforms the content of the replay back to the format of the WebBOs (block 620). Thereafter, the Web application renders the application page (block 622) and sends the application page to the requesting user (block 624). Then, operation returns to block 606 to determine whether an exit condition exists.

Thus, the present invention solves the disadvantages of the prior art by binding integration workflow endpoints to Web software components. A relay component is deployed to a Web application. The relay component converts the Web software components to the format expected by an integration broker. Developers may then implement an integration strategy entirely in the integration broker and then connect the presentation layer of the Web pages to the integration broker logic via the Web software components. When the data format of the disparate applications changes or is otherwise updated, developers can simply rebind the business object definitions from the integration brokers to Web software components, rather than recoding the entire Web application.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for binding integration workflow endpoints to a Web application, the method comprising:
    providing one or more Web software components to a Web application, wherein the one or more Web software components interface with the Web application and correspond to a first set of one or more application software components defined in an integration broker, wherein the Web software components connect a presentation layer of web pages of the Web application to software logic of the integration broker, and wherein the Web application, the Web software components, and the web pages are deployed to a Web application server;
    providing a relay component to the Web application, wherein the relay component is exported to a development environment for the Web application and is also deployed to the Web application server, and wherein the relay component interfaces on one end with an access interface of the integration broker and interfaces on another end with the Web software components, and wherein the relay component is configured to convert the first set of one or more application software components from a first set of one or more collaboration objects to the one or more Web software components and vice versa, and wherein business object definitions from the integration broker rebind to the Web software components to enable development of non-web applications separate from development of the Web application, and wherein the first set of one or more collaboration objects and a second set of one or more collaboration objects are instances of collaboration templates defined in the integration broker, and wherein the collaboration templates define an integration workflow of data between disparate applications, and wherein the second set of one or more collaboration objects perform integration work by accepting a second set of one or more application software components from a first set of applications at a first set of ports, transforming data, and replying to a second set of applications at a second set of ports; and
    responsive to a request for a dynamic Web page: invoking a given Web software component from the one or more Web software components; converting, by the relay component, content of the given Web software component to a format expected by the integration broker; and executing an integration solution by the integration broker, wherein the relay component interfaces between the one or more Web application software components and the first set of one or more application software components, and wherein executing the integration solution by the integration broker comprises:
    generating a resulting application software component;
    converting, by the relay component, content of the resulting application software component to a format of the given Web software component; and
    generating the dynamic Web page based on the given Web software component.

2. The method of claim 1, further comprising:
    returning the generated dynamic Web page to a requesting user.

3. The method of claim 1, wherein providing one or more Web software components comprises:
    developing the integration solution using an integration broker management tool.

4. The method of claim 3, further comprising:
    developing the Web application using a Web application development environment.

5. The method of claim 4, wherein the one or more Web software components are exported by the integration broker management tool to the Web application development environment.

6. The method of claim 4, wherein the relay component is exported by the integration broker management tool to the Web application development environment.

7. The method of claim 3, wherein developing the integration solution comprises:
    developing definitions for the first set of one or more application software components and collaboration templates; and
    deploying the definitions for the first set of one or more application software components and the collaboration templates to the integration broker.

8. The method of claim 1, wherein executing an integration solution comprises:
    retrieving and transforming data from homogeneous applications.

9. An apparatus for binding integration workflow endpoints to a Web application, the apparatus comprising:
    a computer readable storage medium having computer usable program code for executing instructions, the computer readable storage medium comprising:
    a Web application server, wherein the Web application server runs a Web application;
    an integration broker, wherein the integration broker defines a first set of one or more application software components and one or more collaboration templates;
    one or more Web software components at the Web application server, wherein the one or more Web software components interface with the Web application and correspond to the first set of one or more application software components defined in the integration broker, wherein the Web software components connect a presentation layer of web pages of the Web application to software logic of the integration broker, and wherein the Web application, the Web software components, and the web pages are deployed to a Web application server; and a relay component at the Web application server, wherein the relay component is exported to a development environment for the Web application and is also deployed to the Web application server, and wherein the relay component interfaces on one end with an access interface of the integration broker and interfaces on another end with the Web software components, and wherein the relay component is configured to convert the first set of one or more application software components from a first set of one or more collaboration objects to the one or more Web software components and vice versa, and wherein business object definitions from the integration broker rebind to the Web software components to enable development of non-web applications separate from development of the Web application, and wherein the first set of one or more collaboration objects and a second set of one or more collaboration objects are instances of collaboration templates defined in the integration broker, and wherein the collaboration templates define an integration workflow of data between disparate applications, and wherein the second set of one or more collaboration objects perform integration work by accepting a second set of one or more application software components from a first set of applications at a first set of ports, transforming data, and replying to a second set of applications at a second set of ports, wherein responsive to a request for a dynamic Web page: the Web application invokes a given Web software component from the one or more Web software components; the relay component converts content of the given Web software component to a format expected by the integration broker; and the integration broker executes an integration solution, wherein the relay component interfaces between the one or more Web application software components and the first set of one or more application software components, and wherein executing the integration solution by the integration broker comprises:
generating a resulting application software component; converting, by the relay component, content of the resulting application software component to a format of the given Web software component; and
generating the dynamic Web page based on the given Web software component.

10. The apparatus of claim 9, wherein the Web application returns the generated dynamic Web page to a requesting user.

11. The apparatus of claim 9, further comprising:
an integration broker management tool configured to develop the integration solution.

12. The apparatus of claim 11, further comprising:
a Web application development environment configured to develop the Web application.

13. The apparatus of claim 12, wherein the one or more Web software components are exported by the integration broker management tool to the Web application development environment.

14. The apparatus of claim 12, wherein the relay component is exported by the integration broker management tool to the Web application development environment.

15. The apparatus of claim 11, wherein the integration broker management tool is configured to develop definitions for the first set of one or more application software components and collaboration templates and deploy the definitions for the first set of one or more application software components and the collaboration templates to the integration broker.

16. The apparatus of claim 9, wherein the integration broker retrieves and transforms data from homogeneous applications.

17. A computer program product for binding integration workflow endpoints to a Web application, the computer program product comprising:
a computer usable storage device having computer usable program code embodied therein;
computer usable program code configured to provide one or more Web software components to a Web application, wherein the one or more Web software components interface with the Web application and correspond to a first set of one or more application software components defined in an integration broker, wherein the Web software components connect a presentation layer of web pages of the Web application to software logic of the integration broker, and wherein the Web application, the Web software components, and the web pages are deployed to a Web application server;
computer usable program code configured to provide a relay component to the Web application, wherein the relay component is exported to a development environment for the Web application and is also deployed to the Web application server, and wherein the relay component interfaces on one end with an access interface of the integration broker and interfaces on another end with the Web software components, and wherein the relay component is configured to convert the first set of one or more application software components from a first set of one or more collaboration objects to the one or more Web software components and vice versa, and wherein business object definitions from the integration broker rebind to the Web software components to enable development of non-web applications separate from development of the Web application, and wherein the first set of one or more collaboration objects and a second set of one or more collaboration objects are instances of collaboration templates defined in the integration broker, and wherein the collaboration templates define an integration workflow of data between disparate applications, and wherein the second set of one or more collaboration objects perform integration work by accepting a second set of one or more application software components from a first set of applications at a first set of ports, transforming data, and replying to a second set of applications at a second set of ports; and
computer usable program code configured to, responsive to a request for a dynamic Web page: invoke a given Web software component from the one or more Web software components; convert, by the relay component, content of the given Web software component to a format expected by the integration broker; and execute, by the integration broker, an integration solution, wherein the relay component interfaces between the one or more Web application software components and the first set of one or more application software components, and wherein executing the integration solution by the integration broker comprises:
generating a resulting application software component; converting, by the relay component, content of the resulting application software component to a format of the given Web software component; and generating the dynamic Web page based on the given Web software component.

18. The computer program product of claim 17, wherein the Web application is configured to return the generated dynamic Web page to a requesting user.

19. The computer program product of claim 17, wherein the computer usable program code configured to provide one or more Web software components comprises:
   an integration broker management tool configured to develop the integration solution.

20. The computer program product of claim 19, further comprising:
   a Web application development environment configured to develop the Web application.

21. The computer program product of claim 20, wherein the one or more Web software components are exported by the integration broker management tool to the Web application development environment.

22. The computer program product of claim 20, wherein the relay component is exported by the integration broker management tool to the Web application development environment.

23. The computer program product of claim 19, wherein the integration broker management tool is configured to develop definitions for the first set of one or more application software components and collaboration templates and deploy the definitions for the first set of one or more application software components and the collaboration templates to the integration broker.

24. The computer program product of claim 17, wherein the integration broker is configured to retrieve and transform data from homogeneous applications.

* * * * *